(12) United States Patent
Kuronuma

(10) Patent No.: US 8,730,514 B2
(45) Date of Patent: May 20, 2014

(54) RECORDING APPARATUS AND METHOD OF CONTROLLING THE RECORDING APPARATUS BASED ON IMAGE DATA COMMANDS

(75) Inventor: Akira Kuronuma, Kita-Ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/109,856

(22) Filed: May 17, 2011

(65) Prior Publication Data

US 2011/0216370 A1    Sep. 8, 2011

Related U.S. Application Data

(63) Continuation of application No. 11/438,544, filed on May 22, 2006, now Pat. No. 7,969,605.

(30) Foreign Application Priority Data

May 23, 2005   (JP) .................................. 2005-149352

(51) Int. Cl.
*G06K 15/00* (2006.01)
*G06F 3/12* (2006.01)
*B41J 29/38* (2006.01)

(52) U.S. Cl.
USPC ............................ 358/1.16; 358/1.15; 347/14

(58) Field of Classification Search
USPC ......................................................... 358/1.16
See application file for complete search history.

(56) References Cited

U.S. PATENT DOCUMENTS

| 5,533,175 | A | * | 7/1996 | Lung et al. .................... 358/1.16 |
| 5,687,296 | A | * | 11/1997 | Shimada .......................... 358/1.2 |
| 5,954,436 | A | * | 9/1999 | Kageyama et al. ............ 400/188 |
| 6,286,923 | B1 | * | 9/2001 | Sugahara ......................... 347/10 |

* cited by examiner

*Primary Examiner* — Benny Q Tieu
*Assistant Examiner* — Sunil Chacko
(74) *Attorney, Agent, or Firm* — Cannon USA Inc. IP Division

(57) ABSTRACT

A recording apparatus configured to record on a recording medium by using a recording head, includes a first storage unit that stores input data including a command and a first image data, a reading unit that reads out the command and the first image data stored in the first storage unit by using a first pointer, a generating unit that converts the first image data read out from the first storage unit and generate a second image data, a second storage unit that stores the second image data generated in the generating unit, a determining unit that determines whether an amount of data stored in the first storage unit reaches a predetermined value by using a second pointer, and a recording unit that starts a scan for recording after the determining unit determines that the amount of data stored in the first storage unit reaches the predetermined value.

19 Claims, 8 Drawing Sheets

BLOCK COLOR INFORMATION
BkCMY=1111(4 BITS)

BLOCK COLOR INFORMATION
BkCMY=1101(4 BITS)

RECORDING APPARATUS AND METHOD OF CONTROLLING THE RECORDING APPARATUS BASED ON IMAGE DATA COMMANDS

CROSS REFERENCE TO RELATED APPLICATIONS

The present application is a Continuation of U.S. patent application Ser. No. 11/438,544 filed May 22, 2006, which claims priority from Japanese Patent Application No. 2005-149352 filed on May 23, 2005, the entire contents of each of which are hereby incorporated by reference.

BACKGROUND OF THE INVENTION

1. Field of the Invention

The present invention relates to a recording apparatus configured to receive data or a command from outside and record the received data or command, and a method of controlling the recording apparatus.

2. Description of the Related Art

In recent years, devices such as printers have decreased in price and increased in performance. To satisfy these requirements, logic circuits such as a CPU or a memory (RAM, ROM, etc) are often integrated in one chip as an integrated circuit (ASIC etc.)

In the integrated circuit, the RAM occupies a relatively large area. Accordingly, in the devices for which the cost reduction is required, it is necessary to reduce capacity of the RAM as much as possible.

To solve the problem, for example, a technique for reducing capacity of a memory (for example, print buffer) for storing recording data as much as possible by receiving only an amount of data necessary for one scan recording from a host device has been discussed.

With reference to FIG. 4, operation of a recording apparatus will be described. FIG. 4 illustrates data in a print buffer 42 and a recording operation of the data on a recording medium 105. At the same time as recording data of five blocks is stored in the print buffer (B1), a record scanning by a recording head 104 is started (A1).

Then, the recording head scans data of 512 dots corresponding to a first block 1 and completes the recording of the data corresponding to the block 1 (A2). Then, in the print buffer 420, in the memory area where the block 1 data was stored, recording data of block 6 is stored (B2).

As shown by the numeral 111, when the recording head scans data of the next 512 dots and the recording of the block 2 data is completed (A3), recording data of a block 7 is stored (B3) in the memory area of the block 2. Consecutively, the recording is performed by reusing the memory area of recorded block. When recording of recording data of the last block 10 is completed, a main scanning by the recording head 104 is completed. Thus, the recording is efficiently performed by using a print buffer having less capacity than the recording data corresponding to the amount of one scanning.

FIGS. 6A and 6B illustrate an example to save memory capacity of the print buffer. FIG. 6A illustrates a state in which recording data corresponding to each color in a block is stored. In this case, in the order of black (Bk), cyan (C), magenta (M), and yellow (Y), data of the maximum of 128×512 dots can be recorded respectively. The maximum of volume of this block is 128×512×4 dots. FIG. 6B illustrates a case in which recording data for recording dots of magenta does not exist. In this case, recording data of black (Bk), cyan (C), and subsequently, yellow (Y) is recorded, and the memory capacity is reduced to 128×512×3 dots.

In the case of FIG. 6A, block color information which shows whether the recording data exists on each color, is Bk, C, M, Y=(1111) (4 bits) since all color data exist. On the other hand, in the case of FIG. 6B, since the recording data of magenta does not exist, the block color information is Bk, C, M, Y=(1101) (4 bits). Since it is possible to reduce the recording data and store the reduced recording data, the used region in each block in the print buffer can be saved.

FIG. 2 illustrates a state in which data received from the host device is stored in a receive buffer 41. The upper part of FIG. 2 is a head address of the receive buffer. From the head address (address 0), the data is stored in the buffer in sequence. In the receive buffer, as shown in FIG. 2, commands (image data commands) and data (image data) are stored in order of reception. These commands and data are read out in order of reception.

A mode set command indicates information about printing (recording) operation to the recording apparatus (printer). For example, the mode set command includes information about a size of paper, operation mode (for example, image quality priority mode, speed priority mode etc.), type of color (for example, black-and-white mode, color mode, etc), shape of block per one color for print buffer, the number of color, or the like.

The image data commands and image data corresponding to each block are transmitted from a host device. The image data command includes information about the number of data per block, etc. The image data corresponds to print data (recording data) of each block.

FIG. 3 illustrates a process of print data in a conventional printer. A CPU 10 sets a start address and an end address of a receive buffer region to a receive buffer control circuit 7 in advance. In an example of FIG. 2, the start address is "0" and the end address is "1".

The CPU 10 allows an interface control circuit 5 to receive data. The data is sent from a host (host device) 50. The data sent from the host 50 is received in the interface control circuit 5 in an ASIC 20. The interface control circuit 5 sends the data to the receive buffer control circuit 7. The receive buffer control circuit 7 uses a write pointer 101 which is managed by a receive buffer address management circuit 1, through a memory controller 3, and stores the data in the receive buffer 41 which is provided in memory 4. The receive buffer address management circuit 1 updates a value of the write pointer 101 every time the memory controller 3 writes in the memory 4.

After it is confirmed that the data has been stored in the receive buffer 41, the CPU 10 uses a read pointer 102, which is managed by the receive buffer address management circuit 1, and reads out the data from the receive buffer. The receive buffer address management circuit 1 updates the value of the read pointer 102 every time the data is read out from the memory.

When the readout of the receive data is started, firstly, the mode set command is read out. The CPU 10 interprets the readout command and obtains information about a print mode, the number of colors, etc. In accordance with the information, blocks are allocated in a print buffer. For example, the number of blocks or size of the block is set to a print buffer control circuit 8.

Further, the CPU 10, by using the read pointer 102, reads out an image data command 1 stored in the receive buffer 41 and interprets the command. In the image data command 1, the number of data of a subsequently stored image data 1 is written. The CPU interprets the image data command 1 and knows the number of print data in a block to be received.

After the CPU 10 interprets the image data command, configure the setting for an unpack control circuit 6 on basis of the image data command. Then, the unpack control circuit 6 reads out the image data 1 stored in the receive buffer using the read pointer 102. The readout is performed by, for example, a DMA transfer, and the read pointer 102 indicates that addresses of DMA sender proceeds.

Since the image data 1 is packed, an unpack process is performed in the unpack control circuit 6, and the data is transferred to a print buffer control circuit 8. When the DMA transfer of the image data 1 is completed, the unpack control circuit 6 reads out an image command 2 stored in the receive buffer and interprets the readout command using the read pointer 102. Then, an image data 2 is read out. Subsequently, the interpretation of image data commands and readout of image data are performed in order.

The print buffer control circuit 8 controls storage and readout of the unpacked data to and from a print buffer 42. The print buffer control circuit 8 stores the data in the print buffer using a write pointer 201, and reads out the stored data from the print buffer using a read pointer 202.

After the storage in the print buffer 42 is performed and a predetermined amount of image data is stored, the CPU instructs to start an printing operation.

However, the time necessary for the above readout of the image data from the receive buffer takes more time than the time necessary for the storage of the data in the receive buffer. The first reason is that the data to be readout is packed data, and it is necessary to unpack the packed data. The second reason is that the interpretation of commands is performed by the CPU.

Further, in order to confirm that the predetermined number of blocks of data or commands are stored in the receive buffer, it is necessary to read out the commands or data in order of reception.

As shown in FIG. 2, the commands and image data are alternately stored in the receive buffer. Accordingly, it is not possible to read out the next block if the readout of the previously received block is not completed. That is, in order to confirm that a necessary number of blocks has been received, it is necessary to read out the data for all the blocks.

As described above, conventionally, before starting the recording of data corresponding to the amount of one scan by using the recording head, in order to confirm in advance that the recording device has received a predetermined amount of data (for example, data of five blocks), the five blocks of commands and data of the receive buffer 41 are read out. If the five blocks of commands and data of the receive buffer are read out, to prevent the process being wasted, the read out commands and data are stored in the print buffer. Accordingly, a region corresponding to the amount of the five blocks of data, is provided in the print buffer 42.

Thus, as shown in FIG. 7, the number of blocks to be stored in the receive buffer 41 and the number of blocks to be stored in the print buffer 42 are equal. In the example of FIG. 7, the number of blocks is five. Further, FIG. 7 illustrates that the capacity corresponding to one block to be stored in the print buffer 42 is larger than that in the receive buffer 41.

In recent years, further reduction in capacity of memory in recording devices has been required. To reduce the memory capacity, for example, reduction in capacity of print buffer or receive buffer can be considered. However, in the above-described structure, it is difficult to reduce the capacity of memory. Further, improvement of throughput of recording is also required to the recording devices.

SUMMARY OF THE INVENTION

One aspect of present invention is that it overcomes the aforementioned drawbacks.

Another aspect of the present invention is directed to a recording apparatus configured to record on a recording medium by using a recording head. The recording apparatus includes a first storage unit configured to store input data including a command and a first image data, a reading unit configured to read out the command and the first image data stored in the first storage unit by using a first pointer, a generating unit configured to convert the first image data read out from the first storage unit and generate a second image data, a second storage unit configured to store the second image data generated in the generating unit, a determining unit configured to determine whether an amount of data stored in the first storage unit reaches a predetermined value by using a second pointer, and a recording unit configured to start a scan for recording after the determining unit determines that the amount of data stored in the first storage unit reaches the predetermined value.

Another aspect of the present invention is directed to a control method of controlling a recording apparatus configured to record an image on a recording medium by using a recording head. The control method includes a storing step of storing input data including a command and a first image data in a first storage unit, a reading step of reading out the command and the first image data stored in the first storage unit by using a first pointer, a generating step of converting the first image data read out from the first storage unit and generating a second image data, a second storing step of storing the second image data generated at the generating step in a second storage unit, a determining step of determining whether an amount of data stored in the first storage unit reaches a predetermined value by using a second pointer, and a starting step of starting a scan for recording after it is determined, at the determining step, that the amount of data stored in the first storage unit reaches the predetermined value.

Further exemplary embodiments, aspects and features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate numerous exemplary embodiments, features and aspects of the invention and, together with the description, serve to explain the principles of the invention.

DETAILED DESCRIPTION OF THE EXEMPLARY EMBODIMENTS

Various exemplary embodiments, features and aspects of the present invention will now be herein described in detail below with reference to the drawings. In the exemplary embodiments described below, a case in which the present invention is applied to an inkjet printer as a recording device will be described.

First Exemplary Embodiment

Figure 1:
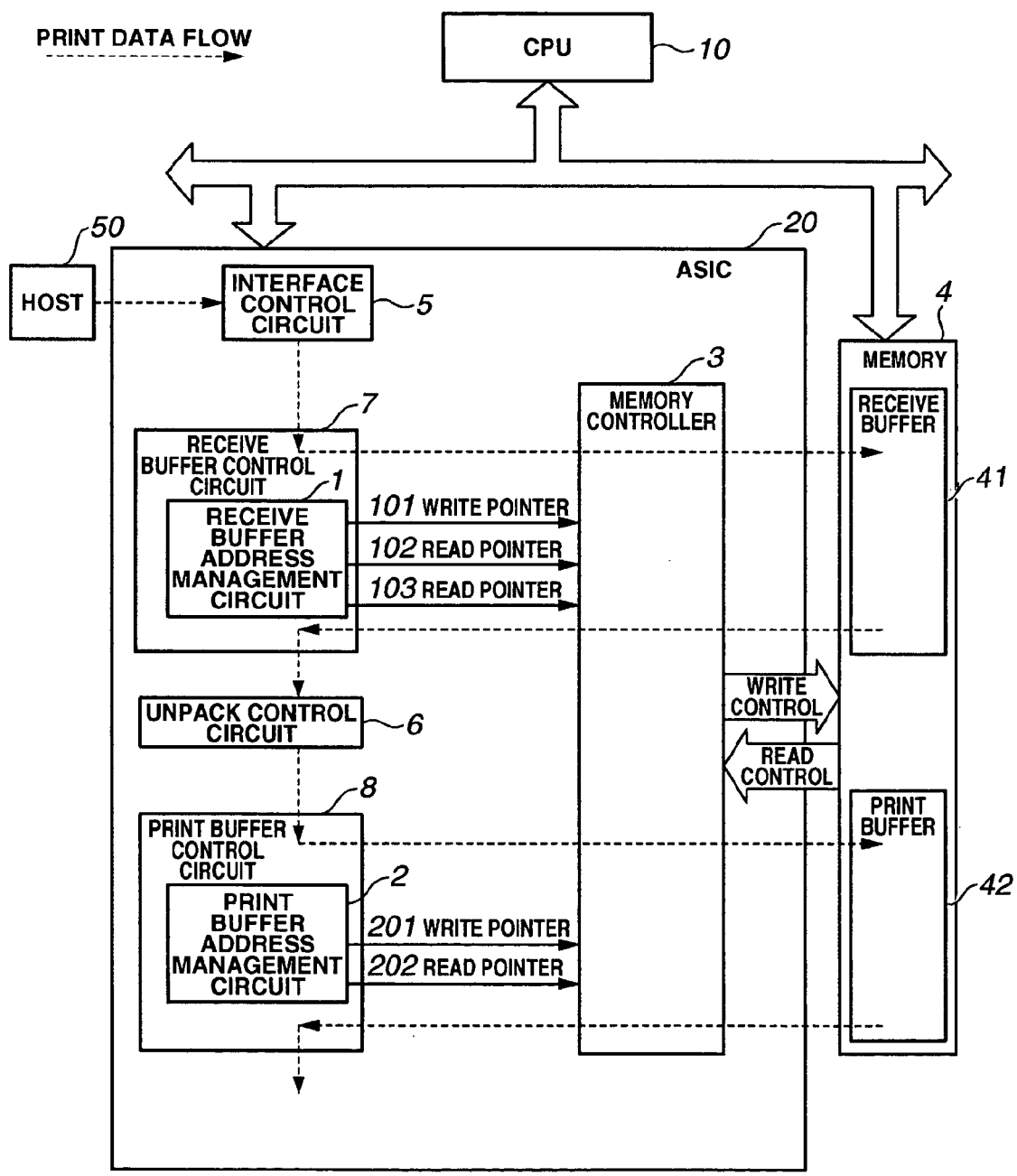
FIG. 1 illustrates a circuit block according to an exemplary embodiment of the present invention.
Figure 3:
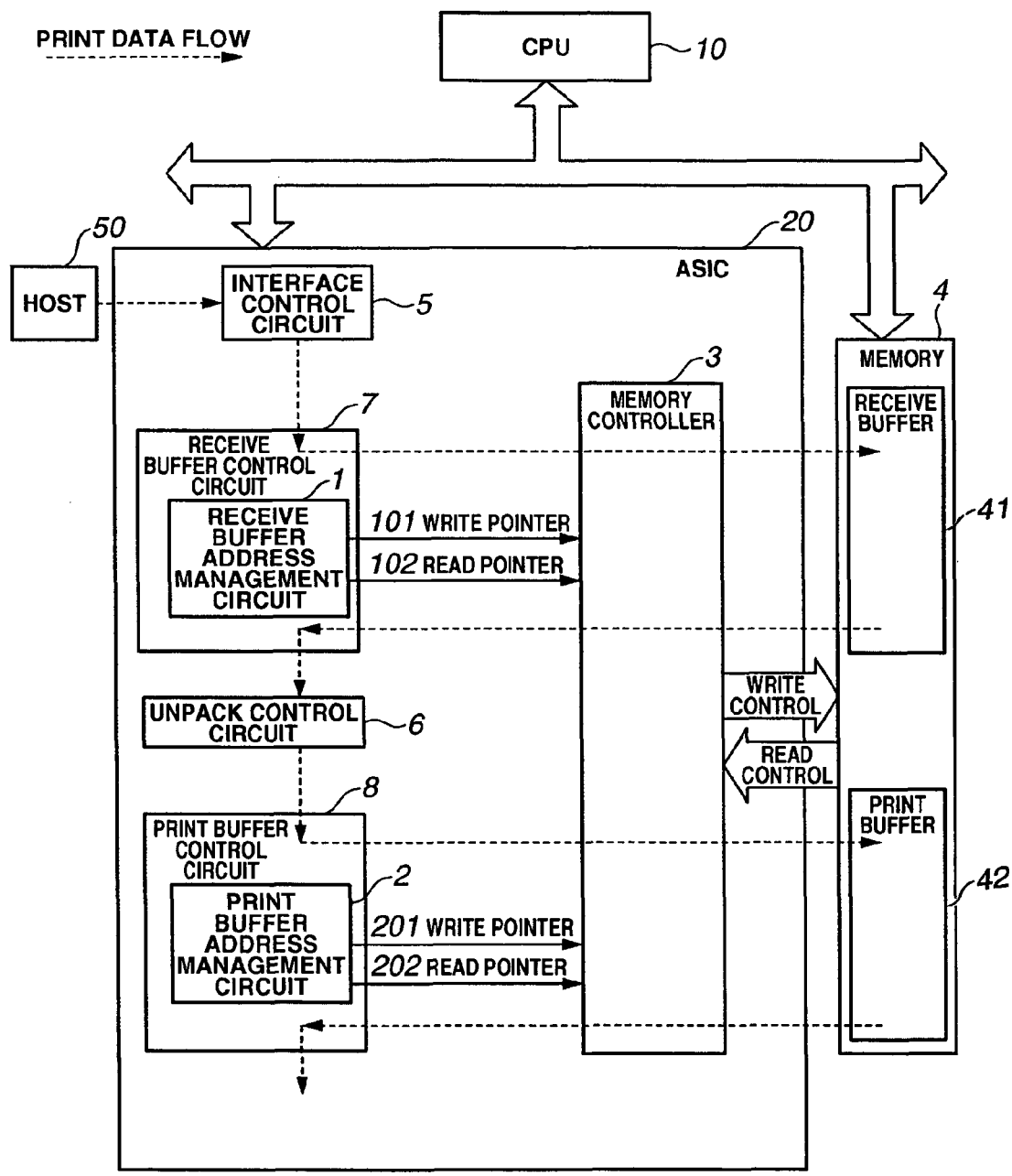
FIG. 3 illustrates a known circuit block.
Figure 4:
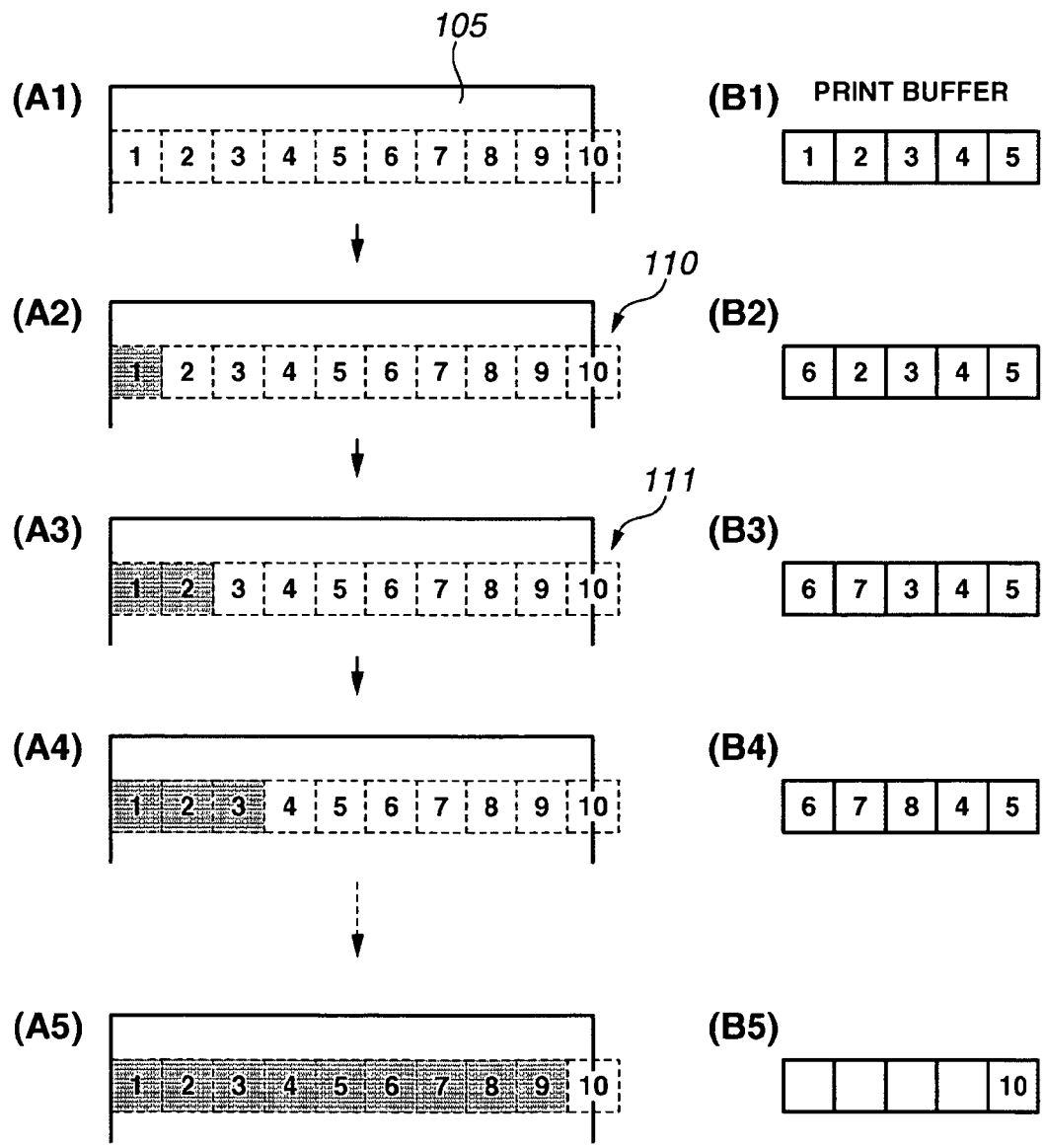
FIG. 4 illustrates a relationship between data in a print buffer and recording operation.

FIG. 1 is a control block diagram according to an exemplary embodiment of the present invention. The contents overlapping with the description of FIG. 3 described in the section of Description of the Related Art will be omitted and the difference between FIG. 1 and FIG. 3 will be described.

In the exemplary embodiment, the interface control circuit 5 communicates with the host (host device) 50 through, for example, an USB interface, and received commands or data are stored in the receive buffer provided in the memory 4 through the receive buffer control circuit 7 and the memory controller 3.

The receive buffer address management circuit 1 manages a write (storage) address and a readout address to and from the receive buffer 41 provided in the memory 4. The receive buffer address management circuit 1 has a write pointer 101 for indicating a write address, a read pointer 102 for indicating a readout address, and a read pointer 103 for indicating a readout address.

The receive buffer control circuit 7 has the receive buffer address management circuit 1, and performs a write process and a readout process to and from the receive buffer 41, using the above-described write pointer 101, the read pointer 102, and the read pointer 103.

A print buffer address management circuit 2 manages a write/readout address to and from a print buffer provided in the memory.

The memory controller 3 performs an actual read/write process to and from the memory in response to a memory access request (REQ signal). For example, from the receive buffer control circuit 7, a REQ signal for requesting data storage, and a REQ signal for requesting data readout are output. Also, from the print buffer control circuit 8, a REQ signal for requesting data storage, and a REQ signal for requesting data readout are output. The memory controller 3 arbitrates these request signals and accesses the memory 4.

An unpack control circuit 6 unpacks print data packed by a predetermined method, unpacks print data read out from the receive buffer 41 and sends the data to the print buffer control circuit.

Figure 2:
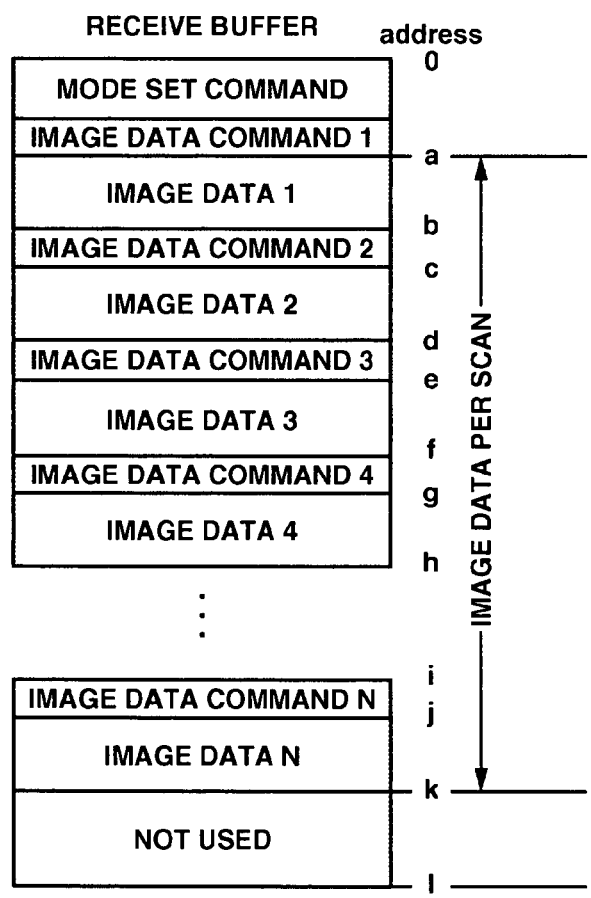
FIG. 2 illustrates a state in which data is stored in a receive buffer.

The flow of the print data is described below. First, the data is sent from the host 50 and received by the interface control circuit 5. As shown in FIG. 2, the received data is divided into command group and the actual print data. The CPU reads and interprets the data received in the interface control circuit 5 while the command group uses the receive buffer read pointer 102 or the 103 in the data in the receive buffer 41.

Then, the receive buffer address management circuit 1 outputs a request signal (readout request) to the memory controller by setting as a parameter either the address of the read pointer 102 or the address of the read pointer 103. The memory controller 3 performs the readout process according to the parameter of command.

The unpack control circuit reads out the print data using the read pointer 102 of the receive buffer control circuit, and converts (unpacks) the data into raster format. Further, the data is converted into column format, and sent to the print buffer control circuit. Then, the print buffer control circuit 8 writes the data, through the memory controller 3, in a region in the print buffer 42.

The control of the read pointers 102 and 103 of the receive buffer 41 according to the exemplary embodiment of the present invention will be described. In the exemplary embodiment, for the purpose of brevity, one scan recording is started after the image data corresponding to the amount of five blocks of data is stored in the receive buffer.

For example, before one record scanning is started by the recording head, the readout process of the receive buffer is performed. Accordingly, every time the record scanning is performed by the recording head, the following process is carried out.

First, before the readout process of the receive buffer 41 is started, values of the read pointers 102 and 103 are set to an address 0.

After the CPU 10 confirms the number of data in the receive buffer, the CPU 10 reads out a mode set command and an image data command 1 from the receive buffer control circuit 7 starting from the address 0 by using the read pointer 102. The reading process is performed until the read pointer 102 indicates an address "a". By the reading process, the image data command is interpreted, and the size of data of the image data 1 is known. Information about the size of the image data command is included in the image data command 1. Accordingly, from the information about the size, the CPU knows the amount of data of the image data command. Then, the CPU 10 sets the size of the data to be transferred (read out) in the DMA transfer to the unpack control circuit.

Next, the value of the read pointer 103 is set to the address "a". Then, a mode is set to the mode for using the read pointer 103.

In order that the read pointer 103 does not read (i.e. "skips") the image data region 1, a data size (b-a) of the image data 1 is set. That is, the address is set to where the reading starts again. In this case, the address is "b". Accordingly, when the address is updated, the address where the read pointer 103 is positioned proceeds from the address "a" to the address "b". The address pointed to by the read pointer increments as the data at each address is read.

When the skip reading process of the data region of the read pointer 103 is completed, a setting is performed to carry out an interrupt (interruption is made effective).

The CPU instructs the receive buffer control circuit 7 to perform the skip process. While the skip process is performed, the read pointer 102 reads out an image data. Then, in accordance with the read pointer 102, the image data 1 is accessed, read out, and transferred to the unpack control circuit 6 in the DMA transfer (however, if the print buffer is full, the DMA readout process waits).

The skipping of the image data region by the read pointer 103 is performed by the receive buffer control circuit 7. The CPU 10 accesses the command region using the read pointer 103 without accessing the image data region.

Additionally, the access of the CPU using the read pointer 103 can be performed to access a part of the command region so as to confirm only that the command is stored.

Further, if there is enough time, if necessary, the CPU 10 may access a predetermined region in the image data region using the read pointer 103.

If all of the image data 1 is not stored in the receive buffer, that is, the value of the write pointer 101 is smaller than the address "b", the value of the write pointer 101 is copied to the read pointer 103. This process is continued until the value of the write pointer 101 becomes "b". The address the write pointer points to increments as data from that address is stored in the receive buffer.

If all of the image data 1 is stored in the receive buffer, that is, the value of the write pointer 101 is larger than the address "b", the value of the read pointer 103 is updated to the address "b" and the process is completed.

In the state that the read pointer 103 indicates the address "b" as above described, an interrupt signal is generated. The CPU 10 detects the interrupt signal, adds a value of 1 to a data reception completion counter, and updates the value of the data reception completion counter from 0 to 1. By the interrupt signal, the CPU 10 starts to interpret an image data command 2 which is the next block.

As described above, since the amount of data of the image data command is known from the information in the image data command 2, by interpreting a part of the image data command 2, the read pointer 103 can proceed from the address "b" to an address "c".

In accordance with the information in the image data command 2, the size of skipped part of the image data 2 region (d-c) is set. Then, the reading of this image data region is skipped.

The process of skip reading of the image data 2 region is performed in a similar way to the above-described image data 1 region. That is, if the storage of the image data 2 to the receive buffer 41 is not completed, that is, the value of the write pointer 101 is smaller than the value "d", the value of the write pointer 101 is copied to the read pointer 103, and the process is continued until the value of the write pointer 101 becomes the value "d".

On the other hand, if all of the image data 2 is stored in the receive buffer 41, that is, the value of the write pointer 101 is larger than the value "d", the value of the read pointer 103 is immediately updated to the value "d" and the process is completed.

After the skipping of the image data region is completed, an interrupt signal is generated, the CPU 10 adds a value of 1 to the data reception completion counter, and updates the value of the data reception completion counter from 1 to 2.

Subsequently, the above-described process is performed in order, and an image data command 5 and image data 5 are processed.

As a result, as the data reception completion counter indicates 5, the CPU 10 issues an instruction to start a scan for recording, and the record scanning by the recording head is started. In the exemplary embodiment, the value at which the record scanning by the recording head is started is set to 5 corresponding to the number of the blocks provided in the region of the receive buffer 41. However, the value is not limited to "5", it may be set to other values, for example, to 4, in accordance with a specification of control.

As described above, the CPU 10 determines that a predetermined amount of data (the number of blocks) is stored in the receive buffer 41, and the CPU 10 starts the scan recording by the recording head. Accordingly, each time the record scanning is started, the CPU 10 determines in advance that the predetermined amount of data (the number of blocks) is stored in the receive buffer 41.

Subsequently, the control of the read pointers 102 and 103 is continued. That is, the control is continued until the readout of the all data of the block corresponding to the amount of one scan is completed (until the address of the read pointer 103 becomes an address "k"). When the address of the read pointer 103 indicates the address "k", updating of the read pointer 103 is stopped (i.e., read pointer 103 stops at the address "k" and does not proceed). In order to perform such control, for example, the pointer is updated with reference to the number of blocks necessary for the recording of one scan (the number of blocks used in one scan).

As described above, the updating of the address of the read pointer 103 can be performed in a short period of time. Further, compared with the time necessary for moving forward the read pointer 103, the readout of the image data 2 takes more time. Accordingly, even if the readout of the image data 2 is not completed, it is possible to move forward the read pointer 103 to the region of the image data command 3. Thus, if the data is stored in the receive buffer 41, whether the updating of the address of the read pointer 102 is proceeding or not, the address where the read pointer 103 is located can be updated. In other words, whether a conversion process (unpack process) of image data in a predetermined block is proceeding or not, the confirmation of the amount of received data (the number of received blocks) is independently performed. Accordingly, it is possible to confirm the amount of received data (the number of received blocks) much faster than the process of readout of the image data, without performing complicated operation or control of the pointer.

Figure 8:
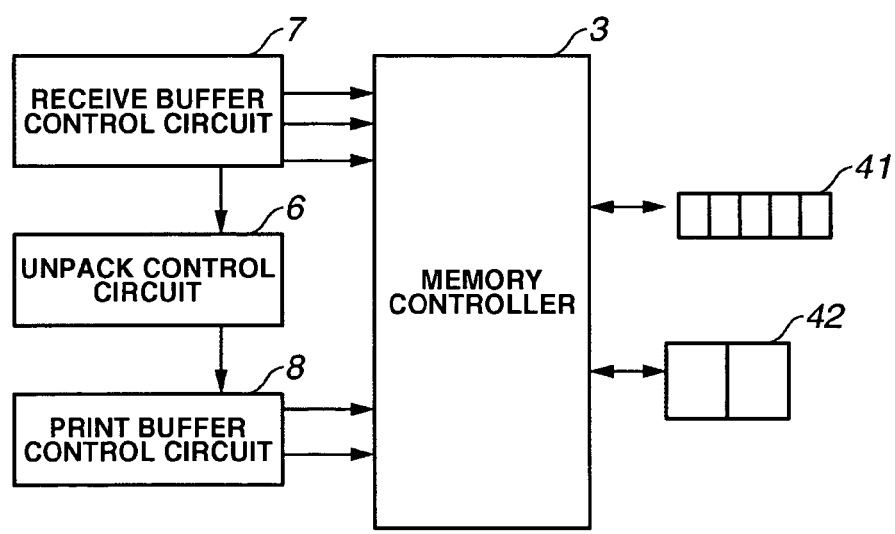
FIG. 8 illustrates a receive buffer and print buffer according to an exemplary embodiment of the present invention.

In the data processing system in the recording apparatus according to the exemplary embodiment, the time necessary for reading out the data from the receive buffer 41 and storing the data in the print buffer 42 is shorter than the time necessary for reading out the data by the recording head. Accordingly, as shown in FIG. 8, it is possible to provide capacity of two blocks in the print buffer 42.

That is, for example, as to a certain amount of image data, since the time necessary for data processing is shorter than the time necessary for the recording by the recording head, the capacity of the print buffer 42 is sufficient when it has the capacity of only two blocks.

For example, after the image data is stored in the two blocks, the scan by the recording head is started. The data is stored, between the two block regions, in the region which completes the readout of the image data. Thus, while the read out process is performed in the one block region, the storage process is performed in the other block region. That is, the number of blocks can be reduced as compared with the case described in the section of BACKGROUND OF THE INVENTION, and it is possible to allot the capacity to the receive buffer or reduce the memory region itself. The number of blocks is not limited to "2", it may be set to other values, for example, to 4, in accordance with a specification of control.

In particular, since the image data to be stored in the receive buffer 41 is packed, it is possible to reduce the amount of memory to be used, compared with a case in which the data is stored in the unpacked state.

Further, in the recording operation of one scan, as compared with the known structure, it is possible to reduce the time necessary for confirming that a necessary amount of data is received from an upper-layer device. Accordingly, it is possible to shorten the time from the start of the reception of the data coming from the host device, till the start of a scan recording. The recording device performs the scan recording many times to record an image of one page. Accordingly, the more often the scan recording is performed, the shorter the time necessary for the recording of one page.

Further, the memory controller 3 controls memory access in response to a request signal from a motor control circuit which controls a motor.

Figure 5:
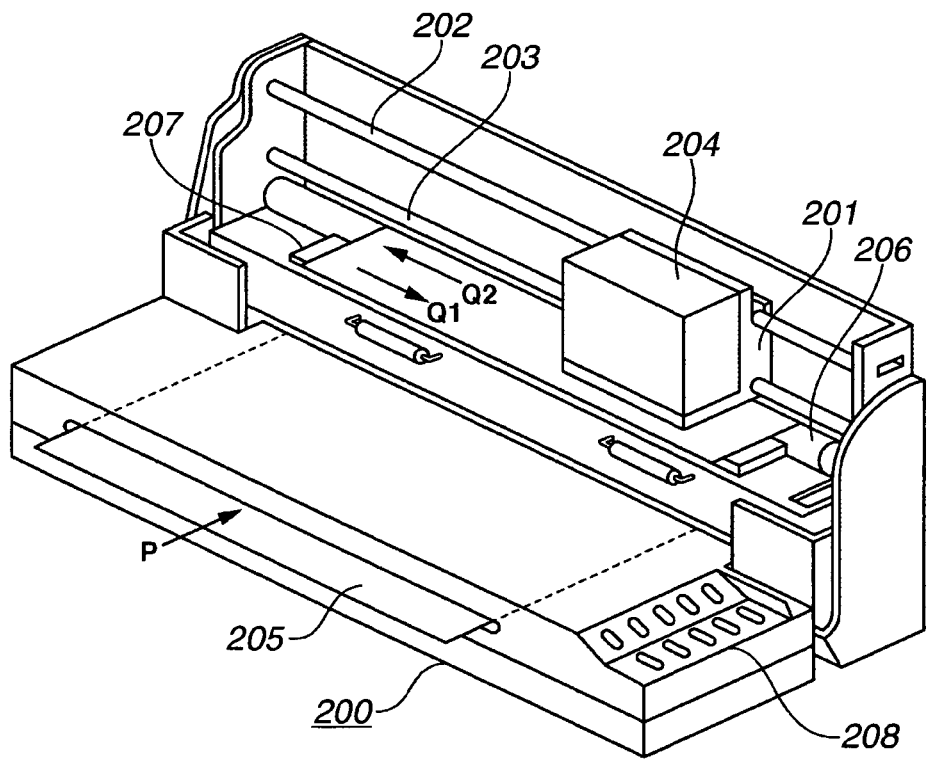
FIG. 5 is a perspective view of a recording device.
Figure 6A:
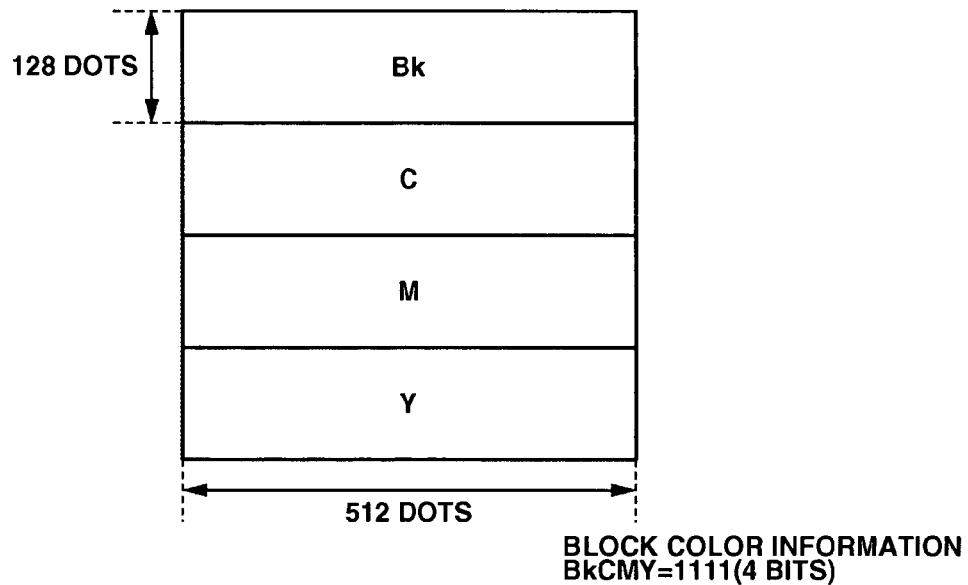
FIGS. 6A and 6B illustrates states of stored data in the print buffer.
Figure 6B:
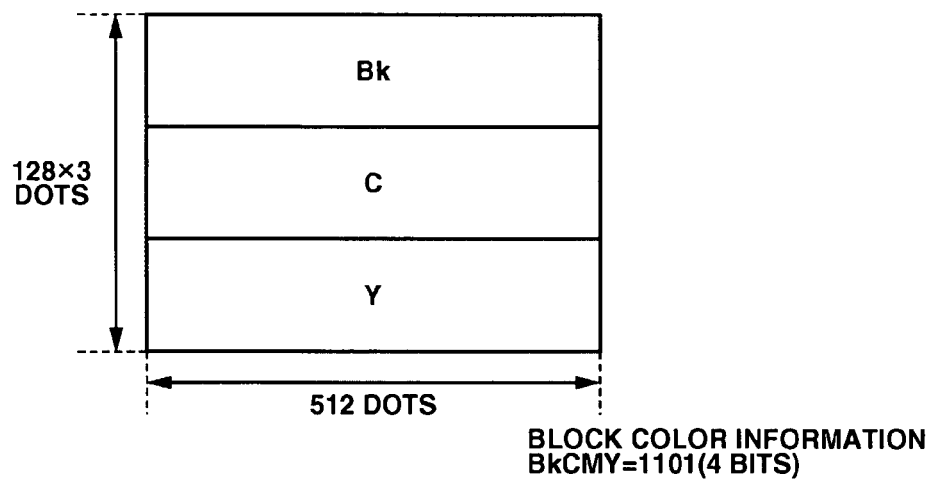
Figure 7:
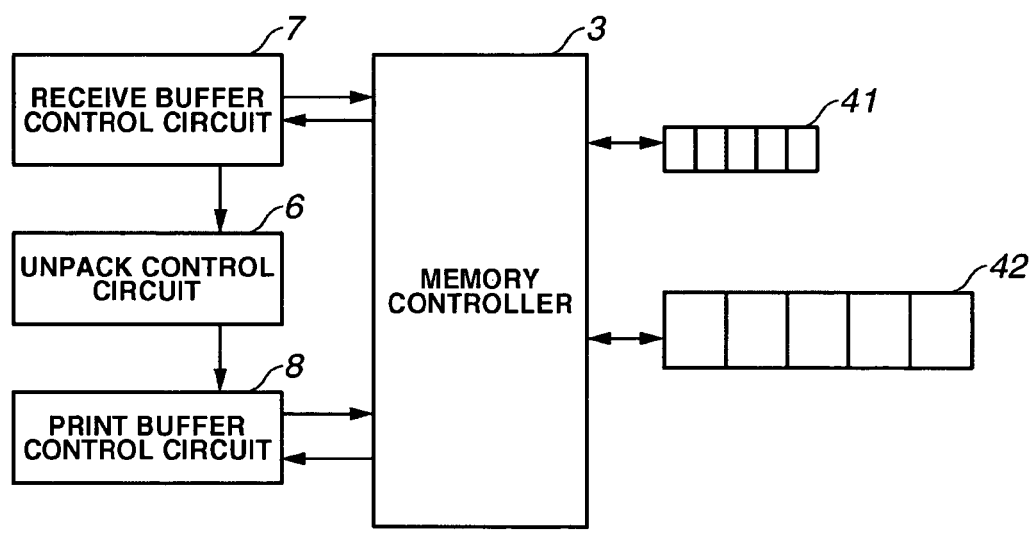
FIG. 7 illustrates a known receive buffer and print buffer.

FIG. 5 is a perspective view illustrating an outline of an inkjet recording apparatus 200 according to the exemplary embodiment. A recording medium 205 inserted into a sheet feeding position of the recording apparatus 200 is conveyed in the direction of the arrow P by rotation of a conveying roller 206, and conveyed to a recordable region where a recording is performed by a recording head 204. In a lower part of the recording medium 205 in the recordable region, a platen 207 is provided. A carriage 201 is movable by the two guide axes 202 and 203 in the axis direction along the guide axes 202 and 203. Driven by a carriage motor (not shown), in a scan region including the recording region, the carriage 201 reciprocates in the direction indicated by the arrows Q1 and Q2, which is the main scanning direction. Thus, the recording apparatus 200 forms an image by scanning the recording medium 205 with the recording head 204. In the record scanning, the recording head 204 starts from a predetermined position 1. When the recording head 204 reaches a predetermined position 2 (recording start position), the recording head discharges ink. When the recording head 204 reaches a predetermined position 3 (recording end position), the recording head 204 stops discharging the ink. When the recording head 204 reaches a predetermined position 4, the recording head 204 stops. The region in the print buffer 42 is divided into a plurality of areas in the scanning direction corresponding to regions of the recording medium 205. When one record scanning by the carriage 201 is completed, the recording medium 205 is conveyed by a certain distance (corresponding to a recording width of the recording head 204) in the sub-scanning direction indicated by the arrow P, and prepares for the next record scanning (main scanning). By repeating the main scanning and the sub-scanning, the recording of one page of the recording medium 205 is performed.

In FIG. 5, the recording head 204 mounted on the carriage 201 includes discharge openings (nozzles) and an ink tank for containing ink. The discharge openings of the recording head 204 are mounted on the carriage 201 such that the discharge openings faces down so as to perform the recording by discharging the ink on the recording medium 205 placed below.

An operating part 208 has a switch and a display part. The switch is used to switch on/off a power source of the recording apparatus 200, set various recording modes, etc, and the display part can display a state of the recording device 200.

The recording head 204 can record four colors; Bk, C, M, and Y. The number of discharge openings of each color, Bk, C, M, and Y, is 128 respectively. The arrangement pitch of discharge opening of each color is (1/600) dpi against the substrate-scanning direction. The space between the discharge openings is about 42 microns. The drive frequency of the recording head 204 is 15 kHz, and the recording head 204 can record at a resolution of 600 dpi against the main scanning direction. Accordingly, the movement speed of the carriage 201 is 635 mm/sec when the recording operation is performed in the main scanning direction.

Second Exemplary Embodiment

In the first exemplary embodiment, the interpretation of image data commands are performed by the CPU 10. However, other structure can be considered. In the following description, those parts similar to the first exemplary embodiment are not described in detail, and a process of interpretation of the image data commands will be described.

For example, the interpretation process of the image data commands can be performed by a circuit block (provided in ASIC 20) other than the CPU. The circuit may be the unpack control circuit 6. In such structure, it is possible to reduce the burden of the CPU which interprets the image data commands. However, to prevent the ASIC 20 from becoming complicated, the CPU may interpret until the image data command 1, and circuits other than the CPU may interpret commands after the image data command 2.

Other Exemplary Embodiments

In addition to the above description in the exemplary embodiments, the number of blocks of the print buffer will be further described. In order to adjust registration, if it is necessary to shift the image data by an amount necessary for the registration adjustment (shift by column unit) in the main scanning direction, one block region can be added to the two block regions, and three block regions can be used.

In the above description, in order to prevent the CPU from accessing the image data regions, the read pointer 103 is controlled to perform the update operation. However, as long as the read pointer 103 works without delay, the read pointer 103 may be placed at a predetermined region in the image data region, for example, at a tip part or end part of the image data region.

Further, in the above description, the unpack control circuit reads out the data from the receive buffer and unpacks the data. However, it is not limited to this structure, and it can be configured to convert multivalued data into binary data.

In addition, the data transferred from the host device may be packed column format data. In this case, it can be configured that the data is unpacked in the unpack control circuit and transmitted to the print buffer control circuit.

Further, parameters of the recording head or the device (the number of the discharge nozzles, resolution, drive frequency, movement speed, and the number of the recording heads) are not limited to the values described in the above descriptions.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A recording apparatus that has a recording head, the recording apparatus comprising:
   a scan unit configured to perform a record scanning operation by the recording head so as to record on a recording medium based on recording data;
   a storage unit configured to store a command and image data corresponding to the command in association with each other, wherein the storage unit stores a plurality of commands and a plurality of pieces of image data for performing one record scanning operation;
   a converting unit configured to convert the image data into the recording data;
   a count unit configured to count a number of commands stored in the storage unit;
   a determining unit configured to determine whether to start the record scanning operation based on a number counted by the count unit; and
   a reading unit configured to read out the command stored in the storage unit so as to count the number of the commands stored in the storage unit independently before reading out the image data and the command stored in the storage unit so as to convert the image data into the recording data.

2. The recording apparatus according to claim 1, wherein the storage unit is configured to store the command in one storage area and store the image data in another storage area.

3. The recording apparatus according to claim 1, wherein the count unit counts a number of commands stored in the storage unit each time the scan unit performs the record scanning operation.

4. The recording apparatus according to claim 1,
   wherein a plurality of block areas is assigned in the storage unit, each of the block areas includes a command area in which a command is stored and an image data area in which image data is stored, and the command area and the image data area are alternately assigned in the storage unit, and wherein the reading unit reads out a command stored in the command area of each of the block areas so that the count unit counts the number.

5. The recording apparatus according to claim 1, wherein the recording apparatus further comprises a receiving unit configured to receive a command and image data from a host device, and wherein the storage unit includes a receive buffer configured to store the commands and the image data and a print buffer configured to store the recording data.

6. The recording apparatus according to claim 5, wherein the reading unit uses a first read pointer in the receive buffer so as to convert the image data into the recording data and uses a second read pointer in the receive buffer so as to count the number.

7. The recording apparatus according to claim 6, wherein the reading unit causes the second pointer to move in advance of the first pointer in an address of the receive buffer.

8. The recording apparatus according to claim 1,
wherein the image data is compressed data, and
wherein the converting unit forms decompressed data from the compressed data, and converts the decompressed data from a raster format into a column format to form the recording data.

9. A recording apparatus that has a recording head, the recording apparatus comprising:
a scan unit configured to perform a record scanning operation by the recording head so as to record on a recording medium based on recording data;
a storage unit configured to store a command and image data corresponding to the command as one block, wherein the storage unit includes a plurality of blocks for performing one record scanning operation;
a converting unit configured to convert the image data into the recording data;
an obtaining unit configured to obtain a number of blocks stored in the storage unit;
a determining unit configured to determine whether to start the record scanning operation based on a number obtained by the obtaining unit; and
a reading unit configured to read out the command included in the plurality of blocks in the storage unit so as to obtain the number of blocks stored in the storage unit independently before reading out the image data and the command stored in the storage unit so as to convert the image data into the recording data.

10. The recording apparatus according to claim 9, wherein the obtaining unit obtains a number of blocks stored in the storage unit each time the scan unit performs the record scanning operation.

11. The recording apparatus according to claim 9,
wherein a plurality of block areas is assigned in the storage unit, each of the block areas includes a command area in which the command is stored and an image data area in which the image data is stored, and the command area and the image data area are alternately assigned in the storage unit, and
wherein the reading unit reads out the command stored in the command area of each of the block areas so that the obtaining unit obtains the number.

12. The recording apparatus according to claim 9, wherein the recording apparatus further comprises a receiving unit configured to receive the command and the image data from a host device, and wherein the storage unit includes a receive buffer configured to store the commands and the image data, and a print buffer configured to store the recording data.

13. The recording apparatus according to claim 12, wherein the reading unit uses a first read pointer in the receive buffer so as to convert the image data into the recording data and uses a second read pointer in the receive buffer so as to obtain the number of blocks.

14. The recording apparatus according to claim 13, wherein the reading unit causes the second read pointer to move in advance of the first read pointer in an address of the receive buffer.

15. A recording apparatus that has a recording head, the recording apparatus comprising:
a scan unit configured to perform a record scanning operation by the recording head so as to record on a recording medium based on recording data;
a storage unit configured to store a command and image data corresponding to the command in association with each other, the storage unit stores a plurality of commands and a plurality of pieces of image data for performing one record scanning operation;
a converting unit configured to convert the image data into the recording data;
a confirmation unit configured to confirm an amount of image data stored in the storage unit;
a determining unit configured to determine whether to start the record scanning operation based on a result of confirmation by the confirmation unit; and
a reading unit configured to read out the command stored in the storage unit so as to confirm the amount of image data stored in the storage unit independently before reading out the image data and the command stored in the storage unit so as to convert the image data into the recording data.

16. The recording apparatus according to claim 15, wherein the confirmation unit confirms an amount of image data stored in the storage unit each time the scan unit performs the record scanning operation.

17. The recording apparatus according to claim 15, wherein the recording apparatus further comprises a receiving unit configured to receive a command and image data from a host device, and wherein the storage unit includes a receive buffer configured to store the commands and the image data, and a print buffer configured to store the recording data.

18. The recording apparatus according to claim 17, wherein the reading unit uses a first read pointer so as to convert the image data into the recording data and uses a second read pointer so as to confirm an amount of image data.

19. The recording apparatus according to claim 18, wherein the reading unit causes the second pointer to move in advance of the first pointer in an address of the receive buffer.

* * * * *